United States Patent [19]

Steely, Jr. et al.

[11] Patent Number: 5,038,278
[45] Date of Patent: Aug. 6, 1991

[54] CACHE WITH AT LEAST TWO FILL RATES

[75] Inventors: Simon C. Steely, Jr., Hudson, N.H.; Raj K. Ramanujan, Leominster, Mass.; Peter J. Bannon, Acton, Mass.; Walter A. Beach, Bedford, Mass.

[73] Assignee: Digital Equipment Corporation, Maynard, Mass.

[21] Appl. No.: 611,337

[22] Filed: Nov. 9, 1990

Related U.S. Application Data

[63] Continuation of Ser. No. 176,596, Apr. 1, 1988, abandoned.

[51] Int. Cl.$^5$ .................. G06F 13/00; G06F 13/28
[52] U.S. Cl. .................. 364/200; 364/243.4; 364/232.9; 364/254.3
[58] Field of Search ... 364/200 MS File, 900 MS File

[56] References Cited

U.S. PATENT DOCUMENTS

| | | | |
|---|---|---|---|
| 3,898,624 | 8/1975 | Tobias | 364/200 |
| 4,314,331 | 2/1982 | Porter et al. | 364/200 |
| 4,370,710 | 1/1983 | Kroft | 364/200 |
| 4,392,200 | 7/1983 | Arulpragasam | 364/200 |
| 4,442,488 | 4/1984 | Hail | 364/200 |
| 4,455,602 | 6/1984 | Baxter et al. | 364/200 |
| 4,489,378 | 12/1984 | Dixon et al. | 364/200 |
| 4,654,819 | 3/1987 | Stiffler | 364/900 |
| 4,912,631 | 5/1990 | Lloyd | 364/200 |

Primary Examiner—Lawrence E. Anderson
Attorney, Agent, or Firm—Kenyon & Kenyon

[57] ABSTRACT

During the operation of a computer system whose processor is supported by virtual cache memory, the cache must be cleared and refilled to allow the replacement of old data with more current data. The cache is filled with either P or N (N>P) blocks of data. Numerous methods for dynamically selecting N or P blocks of data are possible. For instance, immediately after the cache has been flushed, the miss is refilled with N blocks, moving data to the cache at high speed. Once the cache is mostly full, the miss tends to be refilled with P blocks. This maintains the currency of the data in the cache, while simultaneously avoiding writing-over of data already in the cache. The invention is useful in a multi-user/multi-tasking system where the program being run changes frequently, necessitating flushing and clearing the cache frequently.

10 Claims, 1 Drawing Sheet

CACHE WITH AT LEAST TWO FILL RATES

This is a continuation of application Ser. No. 176,596, filed Apr. 1, 1988, now abandoned.

FIELD OF THE INVENTION

The present invention relates to the field of digital computers and their architecture. More particularly, it relates to the filling of cache memories used in such computers.

BACKGROUND OF THE INVENTION

Modern computer systems require memory devices with widely varying performance characteristics. A memory unit capable of extremely rapid information retrieval and transmission is often required to supply some modern central processing units (CPUs) with instructions and data for their operation. Such memories are available, usually in the form of Random Access Memories (RAMs), and are commonly called 'cache' memories. These caches are generally small, on the order of a few thousand bytes, in order to allow the rapid retrieval of data. Since there are few complete programs or data bases that can be stored in memories of that size, computer systems also incorporate memories with larger capacities, but slower access and retrieval times. These memories can include larger RAMs with slower retrieval speeds, bubble memories, disc memories of various types and other memories.

A commonly used method to optimize computer operations is to couple a cache memory directly to the CPU and another, larger, memory unit to both the cache memory and the CPU. In this manner the cache can supply the CPU with the instructions and data needed immediately at a rate which will allow unimpeded CPU operation. The main memory usually supplies refill data to the cache, keeping it full. If an instruction or a required piece of data is not in the cache when the CPU requires it, it can be obtained from the main memory, at the expense of the extra time that this requires.

A problem which arises with caches which use virtual memory mapping occurs when the cache is cleared or flushed.

A memory can be mapped in at least two ways. The first is physical mapping where instructions refer to the actual physical address where the required data is stored. The second way is virtual mapping. Here, the instruction refers to a virtual address which must be translated in some fashion to obtain the physical address where the data is stored. Virtual mapping allows better main memory utilization and is particularly useful in multiprogramming environments as the memory can be allocated without contiguous partitions between the users. Both physically and virtually mapped caches are currently being used in computer design.

The physical location of the cache memory also plays an important role in optimizing computer operation. CPU operations are performed with virtual addresses. If the computer system uses a virtually mapped cache it becomes advantageous to couple the cache directly to the CPU. Any translation from virtual to physical addresses which needs to occur can be accomplished downstream from the cache.

For a number of reasons, such as when a new program is run, the virtual to physical address translation map of a virtually mapped cache changes. When this occurs, the cache must be flushed (cleared) and replaced with a new map.

After the cache is flushed, it is refilled with new data and instructions. In the prior art, after the cache was flushed, it was refilled at the same rate that data or instructions were fed to the cache when a given program was being run for a long period of time. Caches work most efficiently when completely full as fewer attempts to find data or instructions in the cache result in misses that require a search of main memory. Consequently, when the cache was refilled at a constant rate after flushing, numerous "misses" requiring reference to and response from the main memory occurred, resulting in inefficient cache utilization. On the other hand, if the cache is continually refilled or refreshed at a very high rate, other problems occur, such as writing over data or instructions which are still current and useful.

It is an object of this invention to provide a mechanism whereby the cache can be filled at at least two different rates, a fast rate being used immediately after the cache has been cleared and a slower rate being used once the cache has been almost completely refilled.

SUMMARY OF THE INVENTION

This and other objects are achieved in the present invention which provides a method of filling a cache in a computer with information. The method includes the steps of searching the cache for requested information and generating a miss signal when the requested information is not found in the cache, and examining a valid bit of a data block in the cache where the requested information should be located when the miss signal is generated. N data blocks are written to the cache if the valid bit is not on, which indicates that the data in the block was used previously but is no longer current. These N data blocks will include the data block containing the requested information. If the valid bit is on, P blocks of data are written to the cache at one time, where P is less than N, and these P data blocks include a data block that contains the requested information.

Other embodiments according to the present invention use different criteria to determine the number of data blocks to fill the cache with at one time.

DETAILED DESCRIPTION

Figures 1, 2:
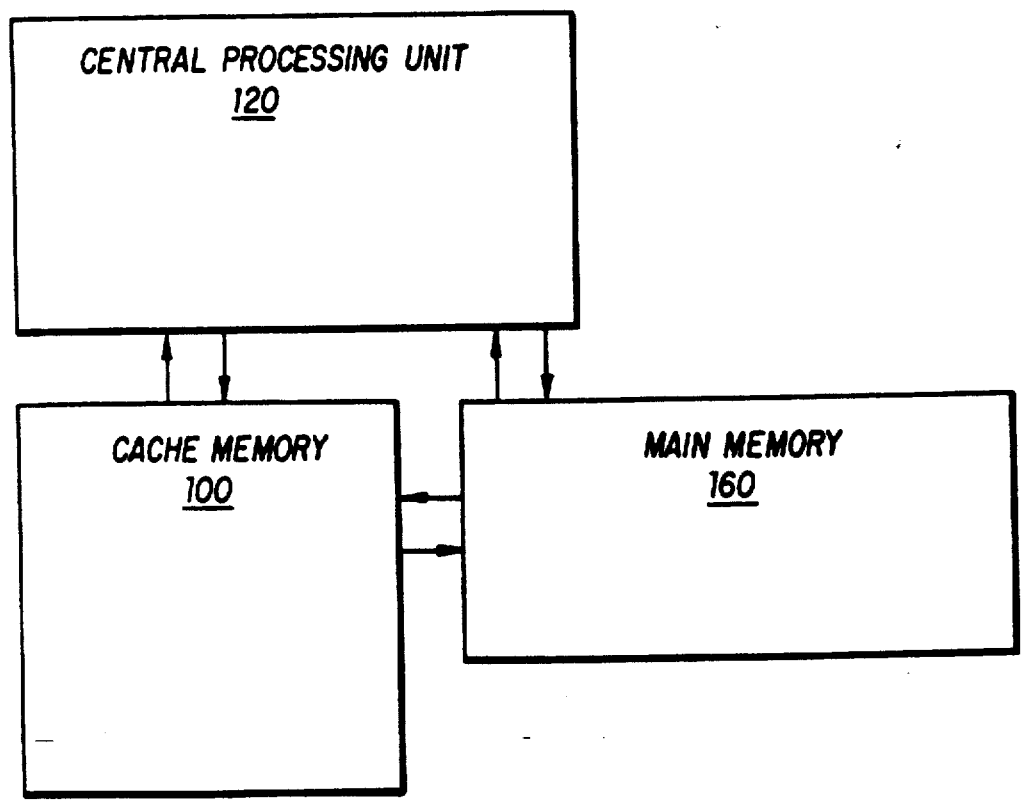
FIG. 1 shows the structure of a data block stored in a cache.
FIG. 2 is a block diagram of a computer system which utilizes a virtually mapped cache.

Referring to FIG. 1, caches generally store information in blocks of data. Each block, here numbered respectively 10, 20, 30, 40, and 50, contains a valid bit, a tag field, a Process Identification (PID) field and a data field.

The valid bit is used to determine if the information contained in the block is valid. When the cache is flushed, all valid bits in each of the data blocks are set to 0, indicating invalid data and allowing the present contents of the block to be written over. As new valid data is supplied to each block the valid bit is turned on, indicating that the data contained therein is valid and usable.

In a multiuser computer environment each user's program is allowed to run for a certain amount of time, whereupon another program is run. For reasons which will be discussed later, it is useful to identify each program being run with a unique PID number. In the present invention a six bit field is used for the PID number, allowing at least sixty-three different processes to be tracked.

The data field is where the data stored in each block is actually located.

Referring now to FIG. 2, cache 100 is virtually mapped and coupled to CPU 120. Cache 100 can be a translation buffer, for example, that caches virtual to physical translations. Main memory 160 is coupled to both cache 100 and CPU 120, as well as a plurality of input/output devices, not shown. As stated before, virtually mapped caches must be flushed every time the virtual to physical mapping changes. One instance of when this occurs is when one running program is changed for another in the CPU.

The present invention optimizes the refilling of the virtual cache through hardware in the following manner. In the following description, we assume that there has been a cache miss, in other words, a failure to find desired data or instructions in the cache. Generally this occurs when the address tag being used for the search refers to a particular block, but the block contains different data or invalid data.

Whenever a miss occurs, a first embodiment of the invention checks to see if the valid bit is off or on. If it is off, it means that no data has been written to this block since the last flush and that therefore the cache should be refilled at a fast rate equal to N blocks at a time. If the valid bit is on, the cache is refilled with one block, based on the assumption that useful data already exists and it would waste time to write over useful data.

The principle of spatial locality, which has been discovered to operate in computer environments, states that when a given block of data or instructions is needed, it is very likely that contiguous blocks of data or instructions will also be required. In all of the discussed embodiments, the number of blocks N is equal to four. Therefore, four blocks which are naturally aligned to one another are used to refill the cache. In the embodiments, the blocks are chosen in even naturally aligned group of four blocks; more precisely, block numbers 0 to 3, 4 to 7, etc. are fetched as a group if the "missed" block falls within that group. For example, if block 2 was found to be invalid, blocks 0 to 3 would be fetched.

A second embodiment of this invention relies on both the PID number and the valid bit and is particularly useful in a multi-user computer system where a number of different programs or processes are run at nearly the same time. Each PID represents a unique number which refers to one of at least thirty-two processes or programs which are running at nearly the same time on a single CPU. In this embodiment, the valid bit is checked after every miss. If the valid bit is off, the situation is considered identical to that described in the first embodiment—the area of the cache is empty, and an N block refill occurs. If the valid bit is on, a second comparison is made, this time between the PID of the process being run and that of the particular block being read. If the two numbers do not match, the program being run is different from that which most recently controlled the CPU and the data or instructions contained in the block are not useful. Hence, the miss is refilled with N blocks in this instance also. Only if the valid bit is on and the PID numbers match is the miss refilled with one block. This avoids writing over data which may still be useful to the process being run.

A further embodiment stores the address of the last miss. When a second miss occurs, the locations of the two misses are compared. If they occurred in the same aligned group of blocks, for example, at blocks 2 and 3, it is assumed that the program being run has moved to a new area, requiring new data and instructions, and the miss is refilled with N blocks. This condition is in addition to those described in the previous embodiment.

A still further embodiment provides a miss counter. Once again, if the valid bit is off and/or the PID numbers do not match, the miss is refilled with N blocks. In addition, the miss counter keeps track of all the read misses that occur even when the valid bit is on and the PID numbers match. If this count exceeds a pre-determined threshold, each miss is refilled with N blocks. In this case it is assumed that the program being run has reached some transition and jumped to a new region, requiring a change of the data and instructions. As soon as a hit occurs, the counter is reset to zero. With this embodiment, it is alternatively contemplated to decrement the counter upon each hit. Only when the counter decreases below a second pre-determined threshold will a miss be refilled with one block.

A further embodiment examines which block in an aligned group of blocks is being read. As in the last two described embodiments, if the valid bit is off and/or if the PID numbers do not match, misses are refilled with N blocks. Even if the valid bit is on and the PID numbers match, if the block being examined is the first block in the aligned group of blocks, the miss is refilled with N blocks. This decision is based upon the traffic patterns of certain programs and data sets.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

We claim:

1. A method of sending information to a cache in a computer, the method comprising the steps of:
   (a) searching the cache for requested information;
   (b) generating a miss signal if the requested information is absent from the cache;
   (c) determining a status of a predetermined bit of a data block in the cache that should contain the requested information if a miss signal is generated according to step (b);
   (d) filling the cache with data blocks at a first rate if the predetermined bit has a status indicative of a first condition, with the data blocks including the data block that contains the requested information; and
   (e) filling the cache with at least one data block at a second rate if the predetermined bit has a status indicative of a second condition, with at least the one data block including the requested information, with the first rate bring faster than the second rate.

2. A method of filling a cache in a computer with information, the method comprising the steps of:
   (a) searching the cache for requested information;
   (b) generating a miss signal if the requested information is absent from the cache;

(c) determining a status of a predetermined bit of a data block in the cache that should contain the requested information, if a miss signal is generated according to step (b) and the requested information is absent from the cache;

(d) filling said cache with data blocks at a first rate if the predetermined bit has a status indicative of a first condition with the data blocks including a data block that contains the requested information;

(e) comparing a process identification number of the data block where the requested information should be located with a process identification number of a process being run by the computer;

(f) filling said cache with data blocks at the first rate if the process identification numbers are other than the same; and (g) filling said cache with at least one data block at a second rate if the process identification numbers are the same with at least the one data block including the requested information, with the first rate being faster than the second rate.

3. A method of filling a cache in a computer with information, the method comprising the steps of:

(a) searching a data block in the cache that should contain the requested information and generating a miss signal if the requested information is absent from the cache;

(b) storing a count of the miss signals generated at step (a);

(c) determining a status of a predetermined bit of the data block which was searched;

(d) filling the cache with data blocks at a first rate if the predetermined bit has a status indicative of a first condition, with the data blocks including a data block that contains the requested information;

(e) comparing the count to a first threshold number of misses;

(f) filling said cache with data blocks at the first rate if the miss signal count exceeds a first predetermined number;

(g) writing at least one data block to the cache at a second rate if the missing signal count is less than, or equal to, the first threshold number and the predetermined bit has a status that is productive of a second condition, with the first rate being faster than the second rate and at least the one data block including the requested information; and (h) decrementing the count of missing signals each time a search for a data block results in a hit, and continuing filling the cache with data blocks at the first rate until the count of missing signals is below a second predetermined number.

4. The method of claim 1, further comprising the step of comparing a process identification number of the data block in the cache where requested information should be located with a process identification number of a process being run by the computer, with the cache being filled at the second rate if the two process identification numbers are the same.

5. The method of claims 1, 2 or 3, wherein the first rate fills the cache at a rate of 4 data block per a first predetermined period and the second rate fills the cache at a rate 1 data block per the first predetermined time period.

6. The method of claims 1, 2 or 3 further comprising the steps of:

storing a location of a miss when searching the cache results in the miss signal being generated;

comparing the stored miss location with a location of a next occurring miss; and filling the cache with data blocks at a first rate if the stored miss location is a first block in a group of blocks that are aligned, as determined by the stored miss location with a location of a next occurring miss.

7. The method of claim 3, further comprising the step of comparing a process identification number of the data block which was searched with a process identification number of a process being run by the computer, with the second rate being used to fill the cache if the two process identification numbers are the same.

8. The method of claims 1, 2 or 3 further comprising the steps of:

storing a location of the miss when searching the cache results in a miss signal being generated;

comparing the stored miss location with a location of a next occurring miss; and filling the cache with data blocks at the first rate if the stored miss location and the next occurring miss location are within a predetermined number data blocks away.

9. A method according to claim 8, wherein the predetermined distance is a same aligned group of blocks.

10. The method of claim 3, wherein step (b) decrements the count to zero each time a search for a data block results in a hit.

* * * * *